United States Patent
Church

[11] Patent Number: 5,558,587
[45] Date of Patent: Sep. 24, 1996

[54] SELF-CONTAINED HYDRAULIC BELT TENSIONER

[75] Inventor: Kynan L. Church, Ceresco, Mich.

[73] Assignee: Eaton Corporation, Cleveland, Ohio

[21] Appl. No.: 440,580

[22] Filed: May 15, 1995

[51] Int. Cl.⁶ ........................................................ F16H 7/10
[52] U.S. Cl. ............................................. 474/112; 474/135
[58] Field of Search ...................................... 474/101, 112, 474/133, 135, 161, 902

[56] References Cited

U.S. PATENT DOCUMENTS

| | | | |
|---|---|---|---|
| 4,808,148 | 2/1989 | Holtz | 474/135 X |
| 5,052,982 | 10/1991 | Ouchi | 474/135 |
| 5,186,689 | 2/1993 | Yamamoto et al. | 474/112 |
| 5,186,690 | 2/1993 | Yamamoto | 474/135 |

*Primary Examiner*—Roger J. Schoeppel
*Attorney, Agent, or Firm*—Frank M. Sajovec

[57] ABSTRACT

A self-contained rotary hydraulic belt tensioner. The tensioner includes a housing mounted for eccentric rotation about a shaft and biased in a first angular direction to apply tension to a timing belt, and a hydraulic element within the housing which is operable to resist rotation of the housing in a direction opposite the first angular direction. The hydraulic element acts against a cam which is received within the housing, a rotary seal acting between the shaft and the housing being effective to contain the oil supply for the hydraulic element within the housing.

3 Claims, 2 Drawing Sheets

SELF-CONTAINED HYDRAULIC BELT TENSIONER

This invention relates to timing belt tensioners for internal combustion engines, and more particularly to a self-contained, hydraulic, rotary belt tensioner.

Rotary belt tensioners, wherein an eccentric pulley is spring-loaded into engagement with a drive belt are well known in the art. When such a belt tensioner is applied to the timing belt of an internal combustion engine it is also known to incorporate a hydraulic slack adjusting element within the tensioner such that the combined spring and hydraulic force maintains a predetermined tension in the belt, a check valve in the hydraulic element preventing retraction of the output element of the tensioner when the force of the belt exceeds the spring force under certain engine operating conditions. An example of such a tensioner is shown in U.S. Pat. No. 5,186,689.

One of the requirements of a hydraulic belt tensioner in an engine timing belt application in that the hydraulic element must have a self-contained oil supply since no engine oil can be permitted to contact the belt.

Several problem areas can arise in the design of a self-contained, hydraulic, rotary belt tensioner, which have not been fully solved by prior art designs. One such problem is that of reliability in the use of sliding seals to contain the oil supply for the hydraulic unit, and another is the need to accommodate for the change in volume which occurs with movement of the operating piston or plunger of the hydraulic element.

The present invention seeks to solve the above problems by providing a rotary belt tensioner which incorporates a cam-operated hydraulic element which is located within an eccentric housing on which the belt pulley is mounted, and wherein a rotary seal contains the oil supply for the hydraulic element.

Other objectives and advantages of the invention will be apparent from the following description when considered in connection with the accompanying drawings, wherein.

Figure 1:
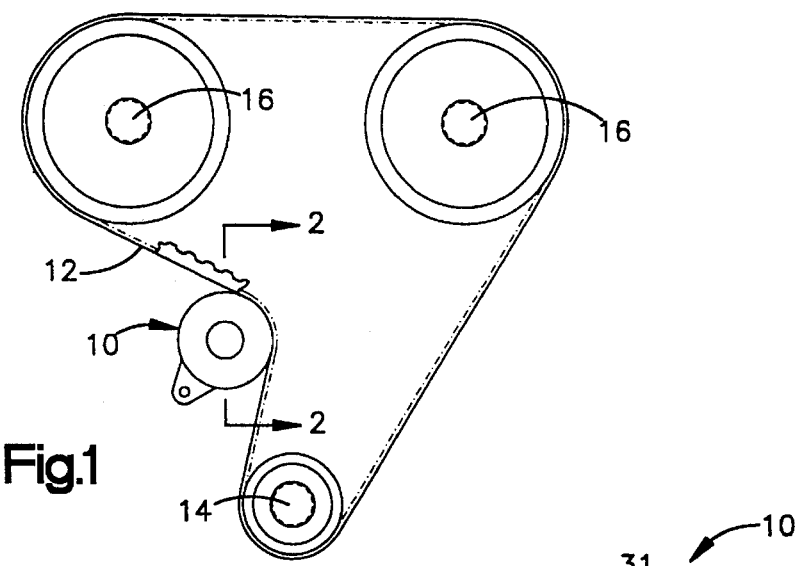
FIG. 1 is a schematic representation of a timing belt drive system incorporating the invention.

Referring to FIG. 1, there is illustrated a belt tensioner assembly 10 attached to an internal combustion engine (not shown) in position to maintain tension in a toothed timing belt 12 connecting the crankshaft 14 of the engine to one or more camshafts 16.

Figure 2:
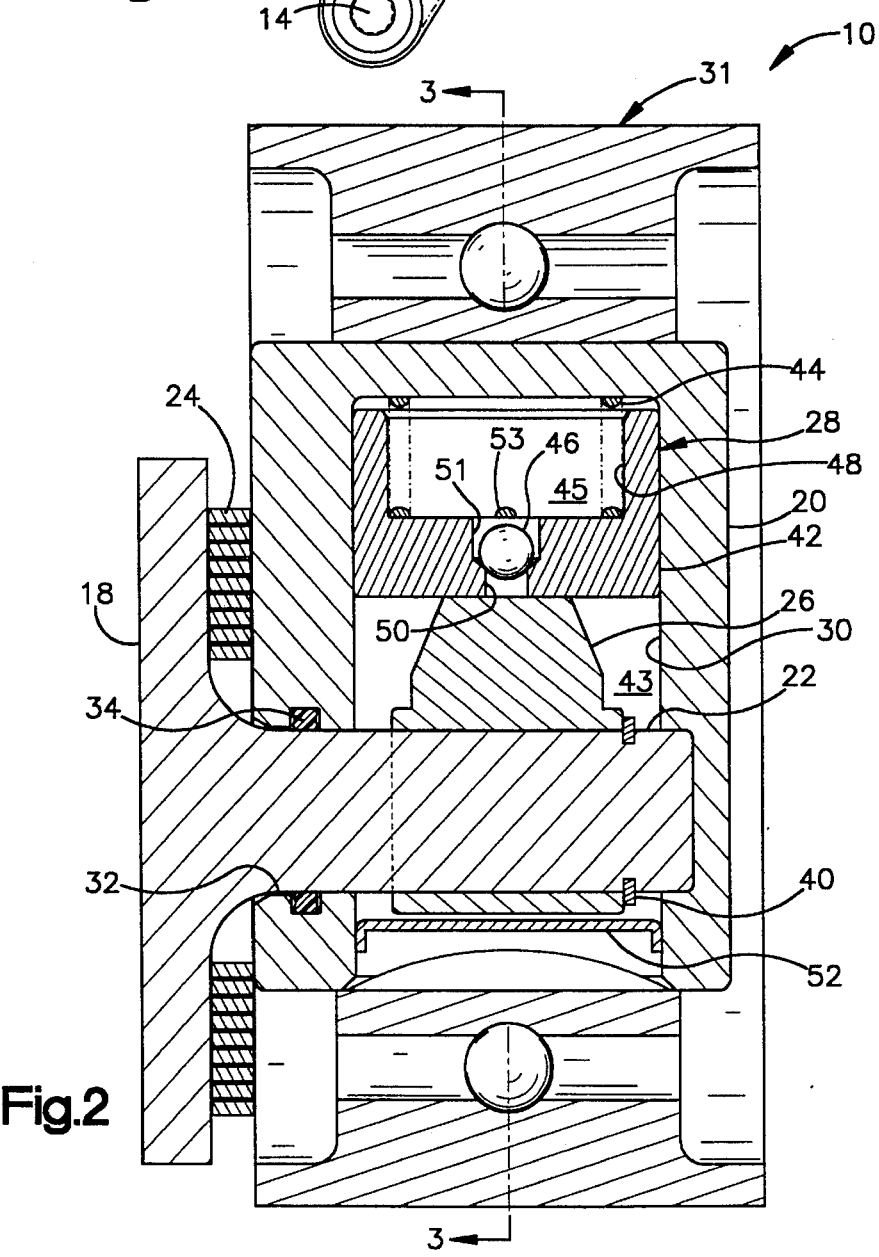
FIG. 2 is a sectional view taken at line 2—2 of FIG. 1.
Figure 3:
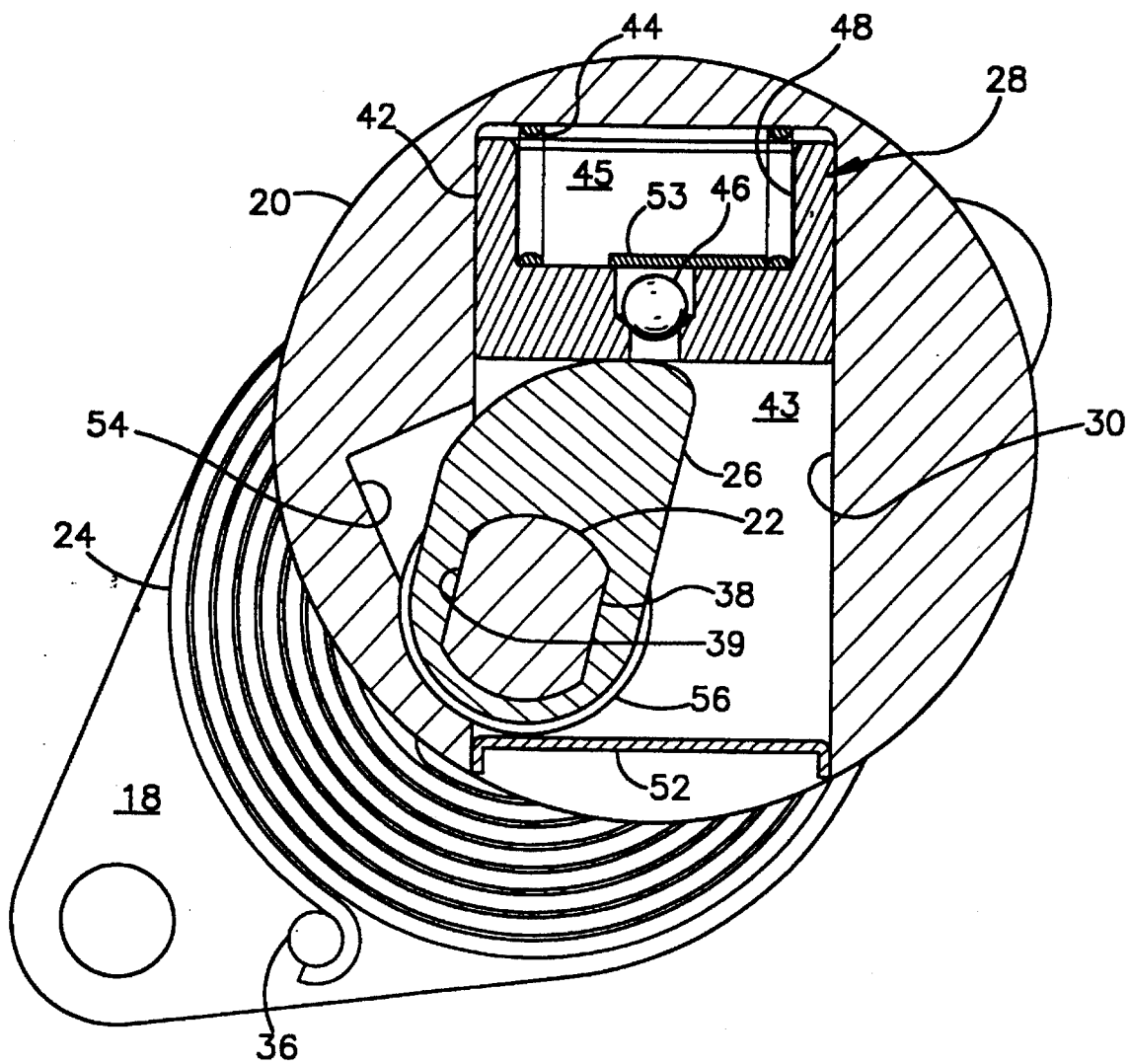
FIG. 3 is a sectional view, with parts removed, taken at line 3—3 of FIG. 2.

Referring to FIGS. 2 and 3, the tensioner 10 comprises a base member 18 which is bolted to the engine, a housing 20 which is mounted for rotation eccentrically about a shaft 22 integral with the base member, a torsion spring 24 acting between the base and the housing, a cam 26 mounted in fixed relation to the shaft 22, and a hydraulic element 28 received within a radial bore 30 formed in the housing and in engagement with the cam. A pulley 31, which engages the belt 12 and which can include an integral anti-friction bearing assembly as shown in FIG. 2, is press fit onto the housing 20. (It should be noted that FIG. 3 shows the tensioner assembly with the pulley removed).

The housing 20 has a blind bore 32 formed eccentrically therein which receives the shaft 22. A lip seal 34 is received in a groove formed in the housing and acts against the shaft. The torsion spring 24 is received between the base member 18 and the housing 20 and is maintained in position by means of a pin 36 received in the base member and a similar pin (not shown) received in the housing. As viewed in FIG. 3, the spring biases the housing 20 counterclockwise to maintain the pulley 31 in tensioning engagement with the belt.

The cam 26 is received over a portion of the shaft 22 which has flats 38, 39 formed thereon and is retained axially in one direction by the full diameter portion of the shaft and in the other direction by a retaining ring 40 received over the shaft. The cam thus remains in the fixed position shown in FIGS. 2 and 3.

The hydraulic element 28 comprises a plunger 42 received within the bore 30, a spring 44 acting between the plunger and the end of the bore 30, and a check ball 46 in the plunger. The plunger is formed with a blind bore 48 in which the spring 44 is received and has a through bore 50 formed therein which is counterbored at 51 to define a seat for the check ball. The check ball is retained by an offset portion 53 of the last coil of the spring. The bore 30 is sealed by a plug 52 which is press fit into the bore.

The volume within the housing is filled with oil, the volume under the plunger 42 defining a low pressure chamber 43 and the volume above the plunger defining a high pressure chamber 45.

To provide clearance for relative movement between the cam and the housing, an angled counterbore 54 is formed in the body of the housing in the plane of the bore 30 and a cylindrical relief 56 is formed in the housing coaxial with the bore 32.

OPERATION

As described above, the pulley 31 rotates freely about the housing 20 which pivots eccentrically about the base 18. Static tension is applied to the belt 12 by the torsion spring 24 through the eccentric rotation of the housing produced by the spring bias. As tension in the belt exceeds the force of the torsion spring because of variations in camshaft torque, the housing 20 rotates clockwise as viewed in FIG. 3, contact between the plunger and the cam causing the plunger to move upward increasing the pressure in the high pressure chamber 45 and causing the check ball 46 to close on its seat. The oil in the high pressure chamber thus supports the plunger providing a force through the cam which prevents further clockwise rotation of the housing relative to the base and maintains tension in the belt 12.

When the belt tension no longer exceeds the force of the torsion spring 24, the housing 20 rotates counter clockwise as viewed in FIG. 3. As this rotation occurs, the plunger spring 44 causes the plunger to move downward following the cam contour, reducing the pressure in chamber 45 and allowing the check ball to open to allow oil to flow into the chamber. Since the plunger of the hydraulic element acts on the cam internally to produce the relative eccentric rotation between the housing and the cam in response to excessive belt tension, there is no change in volume within the housing; therefore it is not necessary to provide volume compensation as there is in prior art devices.

I claim:

1. A belt tensioner comprising a base member having a shaft extending therefrom; a housing received on said shaft for eccentric rotation relative thereto; a bore formed in said housing perpendicular to said shaft, said bore being penetrated by said shaft; rotary seal means acting between said shaft and said housing operable to seal said bore to outside atmosphere; a cam mounted in a fixed angular position on said shaft within said bore; means biasing said housing in a first angular direction relative to said base member; and a hydraulic element received within said bore, said hydraulic element being in engagement with said cam and operable to resist rotation of said housing relative to said base member in a direction opposite said first angular direction.

2. Apparatus as claimed in claim 1, in which said bore is a blind bore, including a closure sealing the open end of said bore; said hydraulic element comprising a plunger received within said bore, said plunger dividing said bore into a first chamber including said cam and a second chamber defined between the bottom of said bore and said plunger; means acting between the bottom of said bore and said plunger to bias said plunger into engagement with said cam, and check valve means received in said plunger, said check valve means being operable to permit fluid flow from said first chamber to said second chamber and to stop fluid flow from said second chamber to said first chamber.

3. Apparatus as claimed in either of claims 1 or 2 in which said means biasing said housing relative to said base member comprises a spiral spring having one end fixed to said base member and the opposite end fixed to said housing.

* * * * *